# 3,557,196
PROCESS FOR PREPARING BETA-KETO-ACIDS

Giorgio Bottaccio and Gian Paolo Chiusoli, Novara, Italy, assignors to Montecatini Edison S.p.A., Milan, Italy, a corporation of Italy
No Drawing. Filed July 31, 1967, Ser. No. 657,090
Claims priority, application Italy, Aug. 2, 1966, 17,971/66; May 10, 1967, 15,913/67
Int. Cl. C07c 61/36
U.S. Cl. 260—514      3 Claims

ABSTRACT OF THE DISCLOSURE

Disclosed is a process for preparing beta-keto-acids having the formula R—CO—CHR'—COOH from ketones R—CO—CH$_2$—R' wherein R and R' are hydrocarbyls containing 1 to 10 C; R' may be H; R and R' taken together give a cycloalkylene. The process is characterized in that the ketone is reacted with carbon dioxide, in the presence of alkaline salts of phenols in an inert polar medium. The alkaline phenol salts preferred are the Li, Na, K salts of phenol, hydroquinone and their methyl homologs. The inert polar medium is preferably selected from trialkylphosphinoxides, trialkyl-phosphates, hexalkyl-phosphotriamides, dialkyl-sulphoxides, dialkyl-formamides, dialkyl-acetamides, tetralkylureas, pyridine, dialkylethers of mono-, di- and tri-ethyleneglycol, wherein alkyl is methyl and/or ethyl.

---

Our invention relates to a process for the preparation of β-keto-acids. As is known, some ketones react with carbon dioxide when treated, under suitable conditions, with suitable alkaline reagents (sodium, sodio-amide, alkaline alcoholates, etc.) to form the salts of the corresponding enols. Magnesium methylcarbonate also favors the introduction of carbon dioxide, by stabilizing the resulting keto-acids as magnesium chelates.

We have found how to introduce CO$_2$ into the ketones, under the conditions under which generally no reaction takes place. To achieve this reaction we use an alkaline phenate in a polar solvent. The reaction which occurs is:

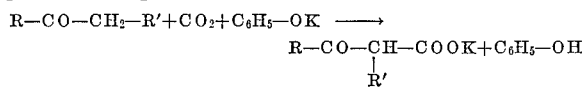

wherein R and R' are hydrocarbyls (monovalent hydrocarbon group such as alkyl, cycloalkyl, aryl etc.) containing 1 to 10 C; R' may be H; R and R' taken together give a saturated hydrocarbon chain. Ketones, which contain a —CH$_2$— near the —CO— are used. Particularly reactive are those ketones which can be easily enolized such as acetophenone, cyclohexanone, cyclopentanone.

The inert polar medium is selected among the non-hydroxylated, liquid, organic compounds, which are free from active methylene groups and have high polarity and a good coordination power for cations. Examples of said solvents are: trimethylphosphinoxide Me$_3$P—O, trimethylphosphate O=P(OMe)$_3$, hexamethylphosphoramide O=P(NMe$_2$)$_3$, dimethylsulfoxide CH$_3$—SO—CH$_3$, dimethylformamide (DMF) H—CO—NMe$_2$, N-dimethylacetamide CH$_3$—CONMe$_2$, tetramethylthiourea CO(NMe$_2$)$_2$, pyridine C$_5$H$_5$N, dimethyl ethers of mono-, di- and tri-ethyleneglycol. The homologs of these solvents, wherein the methyl group is wholly or partially replaced by the ethyl group, are also used. The polar solvent may be substituted by the ketone to be, wholly or partially, carboxylated.

The alkaline salts (Li, Na, K) of phenol and hydroquinone, and their methyl homologs such as mesitol (2, 4,6-trimethylphenol) are used as catalysts. The phenates may be used with either a deficiency or an excess to the ketone. Generally, ratios of from 0.5 to 2 mols of phenate are used for 1 M of ketone, when a solvent is used.

The preferred reaction conditions are at room temperature and pressure, but it is possible to work at temperatures from °0 to 100° C. and CO$_2$ pressures from 1 to 20 atm. CO$_2$ is bubbled in the reaction mixture, in excess of the phenate (up to 10 M for 1 M); the nonreacted CO$_2$ may be recycled; the consumption of CO$_2$ by mols is about corresponding to the amount of phenate. It is preferable at first to introduce the solvent and the phenate and pass the CO$_2$ through for at least 1 hour before adding the ketone. When the ketone is used as the solvent, CO$_2$ is passed through the ketone and then the phenate is gradually added.

To separate the products, the crude product is poured into diluted sulphuric acid (5–15%) and extracted many times with ethyl ether. The extract is shaken with sodium carbonate solution (5–15%) to extract the acids and then with a stoichiometric amount of 5–15% sodium hydroxide to recover the phenol. It is then distilled to separate the ketone. The alkaline solution of the keto-acid is acidified with 5–15% diluted sulphuric acid and then is extracted with a solvent of the keto-acid. The solution of the alkaline phenate is dried (optionally by azeotropic distillation together with a hydrocarbon) and the dried phenate is powdered and recycled.

The following examples are to illustrate the invention without limiting it.

EXAMPLE 1

11 g. of potassium phenate suspended in 45 cc. of DMF were introduced into a 100 cc. 3-necked flask, equipped with cooler, agitator and gas inlet tube. CO$_2$ was bubbled for 2 hours at about 20° C. followed by 2.5 g. of acetophenone. The passage of CO$_2$ was continued for 3 hours. The reaction mixture was poured into dilute H$_2$SO$_4$ and extracted many times with ether. The ether extracts were shaken with a 10% sodium carbonate aqueous solution. By acidification of the alkaline waters with H$_2$SO$_4$, 2 g. of benzoyl acetic acid were obtained.

EXAMPLE 2

Into the flask of Example 1, 11 g. of potassium phenate suspended in 45 cc. of dimethylformamide were introduced. CO$_2$ was bubbled for 2 hours at about 20° C., then 2 g. of cyclohexanone were introduced. CO$_2$ was then passed continuously for 3 hours. By working as described in the preceding example, 2.6 g. of an acidic mixture consisting of the cyclohexanone-carboxylic acid and cyclohexanone-dicarboxylic acid were separated. The latter was the major product.

EXAMPLE 3

Into the flask of the preceding examples, 11 g. of potassium phenate in 45 cc. of cyclohexanone were introduced and CO$_2$ was passed at 20° C. for 4 hours. 6 g. of a carboxylated product prevailing consisting of cyclohexanone-monocarboxylic acid were obtained.

EXAMPLE 4

Into a 3-necked, 50 cc. flask, equipped with cooler, agitator and inlet gas tube, 4.2 g. of sodium phenate C$_6$H$_5$—ONa in 20 cc. DMF were introduced. CO$_2$ was bubbled (flow rate 1 liter/h.) at room temperature for 1 hour, then 4.3 g. of acetophenone CH$_3$—CO—C$_6$H$_5$ were added. The flow of CO$_2$ was continued for 3 additional hours. The reaction mixture was poured in 20 cc. of 10% cold sulphuric acid and was extracted many times with ethyl ether (4 portions of 50 cc. each). The ether extracts were collected and shaken with 50 cc. of a 10% aqueous Na$_2$CO$_3$ solution. By acidification in cold of the alkaline waters with diluted H$_2$SO$_4$ (50 cc. at 10%), 2.2 g. of benzoyl-acetic acid, C$_6$H$_5$—CO—CH$_2$—COOH, were obtained.

EXAMPLE 5

Into the flask of Example 4, 4.2 g. of sodium phenate and 20 cc. diglyme were introduced. $CO_2$ (1 l./h.) was allowed to pass at 20° C. for 1 hour, then 4.3 g. of acetophenone were introduced. $CO_2$ was passed through at room temperature, with agitation, for 3 hours. By working as in Example 4, 1.3 g. of benzoyl-acetic acid were separated. Diglyme is also known as dimethylether of the diethyleneglycol and 2,5,8-trioxa-nonane and has the formula $$CH_3-O-CH_2-CH_2-O-CH_2-CH_2-O-CH_3$$

EXAMPLE 6

Into the flask of Example 4, 4.2 g. of sodium phenate and 20 cc. of dimethyl sulfoxide $CH_3-SO-CH_3$ were introduced. $CO_2$ was bubbled for 1 hour at 20° C., then 4.3 g. of acetophenone were introduced. $CO_2$ was passed, at room temperature and under agitation, for 3 hours. By working as in Example 4, 2.3 g. of benzoylacetic acid were separated.

EXAMPLE 7

Into the flask of Example 4, 4.2 g. of sodium phenate and 20 cc. of dimethyl-acetamide $CH_3-CO-N(CH_3)_2$ were introduced and $CO_2$ was bubbled at 20° C. for 1 hour, then 4.3 g. of acetophenone were introduced. $CO_2$ was passed, at room temperature and under agitation, for 3 hours. By working as in Example 4, 2.1 g. of benzoyl-acetic acid were separated.

EXAMPLE 8

Into the flask of Example 4, 4.2 g. of sodium phenate and 20 cc. of tetramethyl-urea $Me_2N-CO-NMe_2$ were introduced. $CO_2$ was bubbled for 1 hour at 20° C., then 4.3 g. of acetophenone were added. $CO_2$ was passed, at room temperature and under agitation, for 3 hours. By working as in Example 4, 1.8 g. of benzoyl-acetic acid were separated.

EXAMPLE 9

Into the flask of Example 4, 4.2 g. of sodium phenate and 20 cc. of hexamethyl-phosphoramide $O=P(NMe_2)_3$ were introduced. $CO_2$ was bubbled for 1 hour at 20° C., then 4.3 g. of acetophenone were introduced into the flask. $CO_2$ was passed, at room temperature and under agitation, for 3 hours. By working as in Example 4, 3.2 g. of benzoyl-acetic acid were separated.

EXAMPLE 10

Into a 50 cc., 4-necked flask, equipped with cooler, agitator, inlet gas tube and device for the introduction of the solid materials, 20.5 g. of acetophenone were introduced. At room temperature, while bubbling $CO_2$, 4.2 g. of sodium phenate were introduced little by little within 2 hours. $CO_2$ was continuously bubbled, while agitating at room temperature for 3 hours. By working as in Example 4, 1.1 g. of benzoyl-acetic acid were separated.

EXAMPLE 11

Into the flask of Example 4, 4.7 g. of sodium p-cresolate $CH_3-C_6H_4-ONa$ were introduced, together with 20 cc. of DMF. $CO_2$ was bubbled for 1 hour at about 20° C., then 4.3 g. of acetophenone were introduced. $CO_2$ was passed, at room temperature, for further 3 hours. By working as in Example 4, 2.1 g. of benzoyl-acetic acid were separated.

EXAMPLE 12

Into the flask of Example 4, 5.7 g. of the disodium salt of hydroquinone $C_6H_4(ONa)_2$ in 30 cc. of DMF were introduced. $CO_2$ was bubbled (2 l./h.) for 1 hour at a temperature of about 20° C. Thereafter, 4.3 g. of acetophenone were introduced, while continuing to bubble $CO_2$ and agitating, at room temperature, for 3 hours. By working as in Example 4, 3.6 g. of benzoyl-acetic acid were separated.

EXAMPLE 13

Into a 100 cc., 3-necked flask, equipped with cooler, agitator and inlet gas tube, 9.5 g. of sodium phenate in 45 cc. of DMF were introduced. $CO_2$ was bubbled (1.5 l./h.), at about 20° C., for 2 hours, then 4.7 g. of acetone were introduced. $CO_2$ was continuously bubbled and the whole was agitated for about 4 hours. Cold water was added and ether was used for the extraction. The aqueous solution contained about 1.9 g. of acetoacetic acid $CH_3-CO-CH_2-COOH$ and 0.3 g. of acetone-dicarboxylic acid $CO(CH_2 \cdot COOH)_2$ in form of their sodium salts.

EXAMPLE 14

Into a 100 cc., 4-necked flask, equipped with cooler, inlet gas tube and device for the introduction of the solid materials, 45 cc. of acetone were introduced. Then, at room temperature, while bubbling $CO_2$ (l./h.), 9.4 g. of sodium phenate were added little by little within 6 hours. $CO_2$ was allowed to bubble for further 2 hours. The operation was performed as in Example 13. In the aqueous alkaline solution which had been obtained, 1.5 g. of acetoacetic acid and about 0.3 g. of acetone-dicarboxylic acid were obtained, in form of their sodium salts.

EXAMPLE 15

Into the flask of the preceding example, 22.5 cc. of acetone and 22.5 cc. of hexamethyl-phosphoramide were introduced. At room temperature, while $CO_2$ was bubbled (1 l./h.), 9.7 g. of sodium phenate were added little by little, within 5 hours. $CO_2$ was bubbled for further half an hour. Then, working as in Example 13, one obtains an alakaline aqueous solution containing about 4.2 g. of acetoacetic acid and 0.5 g. of acetone-dicarboxylic acid as the sodium salts.

EXAMPLE 16

Into the little flask of Example 4, 4.2 g. of sodium phenate and 20 cc. of hexamethyl-phosphoramide were introduced. $CO_2$ was allowed to bubble (1 l./h.) at room temperature, for 1 hour. Then 5.4 g. of camphor were introduced and, while always bubbling $CO_2$, at room tempearture, the agitation was continued for further 3 hours.

Using the separation modalities of Example 4, 1.3 g. of acid, substantially consisting of the camphor-carboxylic acid, were separated.

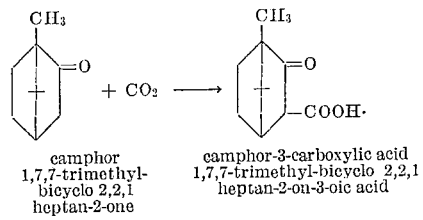

camphor
1,7,7-trimethyl-
bicyclo 2,2,1
heptan-2-one camphor-3-carboxylic acid
1,7,7-trimethyl-bicyclo 2,2,1
heptan-2-on-3-oic acid

EXAMPLE 17

Into a 50 cc., 3-necked little flask, equipped with cooler, agitator, inlet gas tube, 4.2 of sodium phenate and 20 cc. of triethylphosphate were introduced, $O=P(OEt)_3$. $CO_2$ was allowed to bubble at room temperature, for about 1 hour, then 4.3 g. of acetophenone in about 2 cc. of triethylphosphate were added. The bubbling of the gas and the agitation were continued for about 3 hours maintaining the temperature at about 20° C. By the commonly used separation modalities, 2.2 g. of benzoyl-acetic acid were obtained.

EXAMPLE 18

Into a 100 cc., 4-necked flask, equipped with cooler, agitator, inlet gas tube and device for the introduction of the solid materials, 22.5 cc. of acetone and 22.5 cc. of pyridine were introduced. Within 6 and a half hours, at temperatures between 20° and 25° C., 9.8 g. of sodium phenate were introduced little by little. After extraction with ether, the aqueous part contains 2.5 g. of an acid mixture which for the most part consists of acetoacetic acid, as the sodium salt.

EXAMPLE 19

Into a 50 cc., 3-necked little flask, 3.6 g. of lithium phenate and 20 cc. of DMF were introduced. $CO_2$ was allowed to bubble for about 1 hour, at room temperature. Then, 4.3 g. of acetophenone were added, while continuing the agitation and the introduction of $CO_2$ for an additional 3 hours. By working as previously described, 1.2 g. of benzoyl-acetic acid were obtained.

We claim:

1. A process for preparing beta-keto-acids having the formula R—CO—CHR'—COOH starting from ketones R—CO—$CH_2$—R' wherein R and R' are hydrocarbyls containing 1 to 10 C.; R' may be H; R and R' taken together give a cycloalkylene, which comprises reacting the ketone with carbon dioxide of temperatures from 0° to 100° C. and $CO_2$ pressures from 1 to 20 atmospheres, in the presence of alkaline salts of phenols in an inert polar medium.

2. The process of claim 1, wherein the Li, Na and K salts of phenol, hydroquinone and their methyl homologs are used.

3. The process of claim 1, wherein the inert polar medium is selected from trialkylphosphinoxides, trialkylphosphates, hexalkyl-phosphotriamides, dialkyl-sulphoxides, dialkyl-formamides, dialkyl-acetamides, tetraalkylureas, pyridine, dialkylethers of mono-, di- and tri-ethyleneglycol, and alkyl is methyl and ethyl.

References Cited

Gould: Mechanism and Structure in Organic Chemistry (1959).

LORRAINE A. WEINBERGER, Primary Examiner

P. J. KILLOS, Assistant Examiner

U.S. Cl. X.R.

260—515, 526, 537